US012650568B2

(12) United States Patent
Bushnell et al.

(10) Patent No.: US 12,650,568 B2
(45) Date of Patent: Jun. 9, 2026

(54) FANOUT TUBE FOR A FURCATION OF A FIBER OPTIC CABLE AND RELATED METHOD

(71) Applicant: CORNING RESEARCH & DEVELOPMENT CORPORATION, Corning, NY (US)

(72) Inventors: Mark Hanson Bushnell, Hickory, NC (US); Derek Ryan Huffman, Hickory, NC (US); William Carl Hurley, Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 563 days.

(21) Appl. No.: 18/165,374

(22) Filed: Feb. 7, 2023

(65) Prior Publication Data

US 2023/0258902 A1 Aug. 17, 2023

Related U.S. Application Data

(60) Provisional application No. 63/310,681, filed on Feb. 16, 2022.

(51) Int. Cl.
*G02B 6/00* (2006.01)
*G02B 6/44* (2006.01)

(52) U.S. Cl.
CPC ......... *G02B 6/4471* (2013.01); *G02B 6/4429* (2013.01); *G02B 6/4452* (2013.01)

(58) Field of Classification Search
CPC .. G02B 6/4471; G02B 6/4429; G02B 6/4452; G02B 6/00
See application file for complete search history.

(56) References Cited

U.S. PATENT DOCUMENTS

| | | | |
|---|---|---|---|
| 6,137,935 A | 10/2000 | Bohme et al. | |
| 7,035,511 B1 | 4/2006 | Rhoney et al. | |
| | (Continued) | | |

FOREIGN PATENT DOCUMENTS

| | | |
|---|---|---|
| CA | 2589872 A1 | 6/2006 |
| JP | 2004-069939 A | 3/2004 |
| WO | 2023/048922 A1 | 3/2023 |

OTHER PUBLICATIONS

European Patent Application No. 23156319.8, Extended European Search Report dated Jul. 12, 2023; 8 pages; European Patent Office.

*Primary Examiner* — Jennifer Doan
(74) *Attorney, Agent, or Firm* — Kapil U. Banakar

(57) ABSTRACT

A fanout tube for a furcation of a fiber optic cable assembly carrying a plurality of optical fibers includes an outer casing defining an outer surface and an inner cavity configured to receive one or more of the optical fibers therethrough. The outer casing includes an outer jacket that defines a passageway and at least one strength member disposed in the passageway. The strength member includes at least one tensile strand and a substrate that at least partially covers the tensile strand. At least a portion of the substrate defines a confronting surface configured to form at least a portion of the inner cavity of the outer casing and be isolated from the tensile strand, and thus inaccessible to optical fibers being inserted through the fanout tube. A method of forming a fiber optic cable assembly having a furcation formed from such fanout tubes is also disclosed.

16 Claims, 7 Drawing Sheets

(56)            References Cited

U.S. PATENT DOCUMENTS

| 7,221,831 | B2 | 5/2007 | Keller et al. | |
| 7,280,725 | B2 | 10/2007 | Brown et al. | |
| 8,107,781 | B2 * | 1/2012 | Kachmar | G02B 6/4433 |
| | | | | 385/100 |
| 8,818,156 | B2 | 8/2014 | Nav | |
| 9,069,147 | B2 | 6/2015 | Greenwood et al. | |
| 9,075,212 | B2 * | 7/2015 | McAlpine | G02B 6/4433 |
| 9,529,170 | B2 | 12/2016 | Sutehall et al. | |
| 10,185,093 | B2 | 1/2019 | Kleeberger et al. | |
| 2003/0118296 | A1 | 6/2003 | Smith | |
| 2011/0243514 | A1 | 10/2011 | Nave | |
| 2014/0153885 | A1 | 6/2014 | Bradley et al. | |
| 2018/0252886 | A1 | 9/2018 | Kachmar | |

* cited by examiner

FANOUT TUBE FOR A FURCATION OF A FIBER OPTIC CABLE AND RELATED METHOD

PRIORITY APPLICATION

This application claims the benefit of priority of U.S. Provisional Application No. 63/310,681, filed on Feb. 16, 2022, the content of which is relied upon and incorporated herein by reference in its entirety

TECHNICAL FIELD

This disclosure relates generally to fiber optic cables, and more particularly to an improved fanout tube for a furcation of a fiber optic cable, and to a method of making a cable assembly having a furcation utilizing such fanout tubes.

BACKGROUND

Optical fibers are useful in a wide variety of applications, including the telecommunications industry for voice, video, and data transmissions. The benefits of optical fiber are well known and include higher signal-to-noise ratios and increased bandwidth compared to conventional copper-based transmission technologies. To meet modern demands for increased bandwidth and improved performance, tele-communication networks are increasingly providing optical fiber connectivity closer to end subscribers. These initiatives include fiber-to-the-node (FTTN), fiber-to-the-premises (FTTP), fiber-to-the-home (FTTH), and the like (generally described as FTTx).

In an FTTx network, fiber optic cables are used to carry optical signals to various distribution points and, in some cases, all the way to end subscribers. For example, FIG. 1 is a schematic diagram of an exemplary FTTx network 10 that distributes optical signals generated at a switching point 12 (e.g., a central office of a network provider) to subscriber premises 14. Optical line terminals (OLTs; not shown) at the switching point 12 convert electrical signals to optical signals. Fiber optic feeder cables 16 then carry the optical signals to various local convergence points 18, which act as locations for splicing and making cross-connections and interconnections. The local convergence points 18 often include splitters to enable any given optical fiber in the fiber optic feeder cable 16 to serve multiple subscriber premises 14. As a result, the optical signals are "branched out" from the optical fibers of the fiber optic feeder cables 16 to optical fibers of distribution cables 20 that exit the local convergence points 18.

At network access points closer to the subscriber premises 14, some or all of the optical fibers in the distribution cables 20 may be accessed to connect to one or more subscriber premises 14. Drop cables 22 extend from the network access points to the subscriber premises 14, which may be single-dwelling units (SDU), multi-dwelling units (MDU), businesses, and/or other facilities or buildings. A conversion of optical signals back to electrical signals may occur at the network access points or at the subscriber premises 14.

There are many different network architectures, and the various tasks required to distribute optical signals (e.g., splitting, splicing, routing, connecting subscribers) can occur at several locations. Regardless of whether a location is considered a local convergence point, network access point, subscriber premise, or something else, fiber optic equipment is used to house components that carry out one or more of the tasks. The term "terminal" will be used in this disclosure to generically refer to such equipment, which may include fiber distribution hubs (FDH), cabinets, closures, network interface devices, distributor frames, etc. At various terminals in the optical fiber network 10, the incoming optical signal is transmitted through a multi-fiber optical cable, i.e., the fiber optic cable includes a plurality of optical fibers within an outer sheath or jacket, with each optical fiber carrying an optical signal. Depending on the particular application, there may be a need to furcate the incoming fiber optic cable into a plurality of individual optical fibers, which are then optically coupled to other components of the fiber optic network, such as various optical fiber modules, devices, cables (e.g., distribution cables), etc.

Processes for furcating a fiber optic cable are generally known in the industry. For example, one method for furcating a fiber optic cable includes stripping the outer jacket of the fiber optic cable to expose a length of the individual optical fibers carried by the cable. If the individual optical fibers are jacketed, those outer jackets may also be removed to expose bare optical fibers. The bare optical fibers are then pushed through a length of a group of fanout tubes. The ends of the bare optical fibers that extend through the fanout tubes are then subjected to a connectorization process so as to terminate in an optical fiber connector. The fiber optic cable and the fanout tubes are secured within a furcation housing by a suitable bonding agent. The furcation housing operates as a demarcation for the furcation and further operates to stop or block stresses acting on the fiber optic cable (e.g., tugs, pushes, pulls, etc.) from being transmitted to the bare optical fibers in the fanout tubes and the connectors terminating the ends thereof. The fanout tubes operate to protect the bare optical fibers that extend between the furcation housing and the optical fiber connectors.

Current fanout tubes may have a length typically between about one and three meters and a construction as illustrated, for example, in FIG. 2. As illustrated in this figure, the fanout tube 24 includes an outer sheath or jacket 26, an inner furcation tube 28, and a strength member 30 disposed therebetween. The strength member 30 typically includes a loose collection of yarns or filaments 32, such as aramid yarns, to provide tensile strength and shear insensitivity to the fanout tube 24. The inner furcation tube 28 defines a passageway 34 for receiving one or more bare optical fibers 36 (two shown). As noted above, to form the furcation, the ends of the optical fibers 36 are pushed through the fanout tube 24. The purpose of the furcation tube 28 is to provide an unobstructed passageway for pushing the optical fibers 36 through the fanout tube 24. As one can imagine, trying to push the optical fibers 36 through the loose collection of yarns 32 that form the strength member 30, e.g., in the absence of the furcation tube 28, would be difficult if not impossible. For example, the optical fibers 36 would be easily snagged or otherwise entangled with the yarns 32, thereby preventing their passage through the fanout tube 24. Accordingly, the furcation tube 28 is provided as part of the fanout tube construction and is separate from the yarns of the strength member.

Due to the relatively small cross dimension of passageway 34 provided by the furcation tube 28, and the resulting friction between the optical fibers 36 and the wall 38 of the passageway 34 during insertion, it can be difficult to push the optical fibers 36 through the desired length of the fanout tube 24, which as noted above may be over a meter and up to several meters in length. Accordingly, to reduce the resistance to the insertion of the optical fibers 36 through the fanout tube 24, the furcation tube 28 is typically made of a low-friction material so that the desired length of the fanout tube 24 is achievable. By way of example, furcation tubes 28 are commonly made from polytetrafluoroethylene (PTFE), which provides a low coefficient of friction and thereby allows the optical fibers 36 to be inserted through the furcation tube 28 with reduced resistance.

While furcations for fiber optic cables formed with fanout tubes as described above in reference to FIG. 2 are suitable for their intended purpose, such fanout tubes are relatively expensive and are a significant contributor to the overall costs of cable assemblies used in fiber optic networks, such as the fiber optic network 10 illustrated in FIG. 1, or in enterprise networks, such as in data center environments. More particularly, the furcation tube, due to its low-friction material requirements, forms an inordinate share of the cost of the fanout tube. Accordingly, manufacturers seek improved fanout tube arrangements that reduce the cost of the fanout tubes and the fiber optic cable assemblies which incorporate such fanout tubes.

SUMMARY

In one aspect of the disclosure, an improved fanout tube for a furcation of a fiber optic cable assembly carrying a plurality of optical fibers is disclosed. The fanout tube is notably lower in cost due to the elimination of the high-cost furcation tube from its construction. The fanout tube includes an outer casing defining an outer surface and an inner cavity, wherein the inner cavity is configured to receive one or more of the plurality of optical fibers therethrough. The outer casing includes an outer jacket, defining a jacket outer surface and a jacket inner surface that defines a passageway, and at least one strength member disposed in the passageway of the outer jacket. The at least one strength member includes at least one tensile strand and a substrate associated with and at least partially covering the at least one tensile strand. At least a portion of the substrate defines a confronting surface configured to form at least a portion of the inner cavity of the outer casing and be isolated from the at least one tensile strand such that the at least one tensile strand is inaccessible to optical fibers being inserted through the inner cavity of the fanout tube.

In one embodiment, the at least one tensile strand may be at least partially embedded in the substrate. In another embodiment, the at least one tensile strand may be substantially completely embedded in the substrate. In still a further embodiment, the at least one tensile strand may be adhesively bonded to the substrate. In these embodiments, the strength member may have a tubular configuration that is circumferentially continuous. In an alternative embodiment, the strength member may be C-shaped having opposed ends that confront or overlap each other when forming the fanout tube. The C-shaped configuration of the strength member may provide certain manufacturing benefits. In an exemplary embodiment, the substrate of the strength member may be configured as a thin-film web or a thin-film tape that at least partially covers the at least one tensile strand. This allows the strength member to be relatively thin and the size of the inner cavity that receives the optical fibers to be enlarged.

In one embodiment, one or more walls define the inner cavity of the outer casing and the confronting surface of the strength member may form substantially an entirety of the one or more walls that define the inner cavity that receives the optical fibers therethrough. In an alternative embodiment, however, the confronting surface of the substrate of the strength member may form only a portion of the one or more walls that define the inner cavity. The confronting surface of the substrate is configured to have a smooth topology that is devoid of burrs and other surface irregularities. The smooth topology is configured to provide the confronting surface with a coefficient of friction less than about 0.7, and preferably less than about 0.4. Thus, should there be contact between the optical fibers and the strength member, the optical fibers will slide along the strength member with relative ease.

In one embodiment, the outer jacket and the at least one strength member may be integrated together to form a monolithic integrated jacket. This may allow the inner cavity to be even larger. In an alternative embodiment, the outer jacket and the at least one strength member may be separate elements of the outer casing and formed or connected together to form the outer casing. In one embodiment of the strength member, the at least one tensile strand may have a solid cylindrical configuration and the substrate may form an outer coating or cover that encapsulates the at least one tensile strand. In this embodiment, in addition to the outer cover forming part of the inner cavity of the outer casing, the inner wall of the outer jacket may also form at least a portion of the inner cavity.

In one embodiment, the at least one tensile strand may include a plurality of elongate yarns, such as aramid or glass yarns, collected in a bundled arrangement. In one embodiment, the at least one strength member includes only a single tensile strand. In an alternative embodiment, however, the at least one strength member may include a plurality of tensile strands distributed uniformly or non-uniformly relative to the substrate. In one embodiment, the outer casing includes only a single strength member. In an alternative embodiment, the outer casing may include a plurality of strength members. Thus, the fanout tube may have a variety of configurations with different number of strength members and different numbers of tensile strands.

In another aspect of the disclosure, a cable assembly includes a fiber optic cable, having a first end and carrying a plurality of optical fibers, and a furcation formed at the first end of the fiber optic cable. The furcation includes a plurality of fanout tubes each according to the first aspect described above. Each fanout tube includes one or more optical fibers of the plurality of optical fibers extending therethrough and a plurality of fiber optic connectors, wherein each connector terminates the one or more optical fibers extending through a respective one of the plurality of fanout tubes. In one embodiment, the fiber optic cable includes a second end and the cable assembly further includes a furcation formed at the second end of the fiber optic cable.

In yet another aspect of the disclosure, a method of making a fiber optic cable assembly is disclosed. The method includes providing a fiber optic cable having a first end and a second end, the fiber optic cable carrying a plurality of optical fibers and forming a furcation at the first end of the fiber optic cable. The forming step for the furcation includes inserting the first end of the fiber optic cable through a first end and a second end of a furcation housing to provide a working length of the fiber optic cable beyond the second end of the furcation housing; stripping the outer jacket of the fiber optic cable along at least a portion of the working length to expose the plurality of optical fibers and one or more strength members of the fiber optic cable; inserting the ends of the stripped and exposed optical fibers through a plurality of fanout tubes, each fanout tube configured according to the first aspect described above; inserting the ends of the plurality of fanout tubes through the second end of the furcation housing; depositing a bonding agent in the furcation housing to secure the plurality of fanout tubes to the housing; and terminating the ends of the stripped optical fibers extending through the fanout tubes with a fiber optic connector. In one embodiment, the method may further include forming a furcation at the second end of the fiber optic cable. The furcation at the second end of the fiber optic cable may be made in the same manner as the furcation at the first end of the fiber optic cable.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. In general, the description relates to an improved fanout tube for furcating a multi-fiber optical cable. More particularly, the improved fanout tube reconfigures the strength member to isolate the tensile strands (e.g., elongate yarns) from the optical fibers that are inserted through the fanout tube, thereby preventing any significant contact between the tensile strands and the optical fibers that might cause the optical fibers to get snagged or otherwise entangled with the yarns of the tensile strands as they are pushed through the fanout tube. This is achieved in various embodiments by associating a substrate with the tensile strands such that the substrate at least partially covers the tensile strands. Moreover, the substrate includes a surface that is configured to confront the optical fibers when the strength member is arranged as part of the fanout tube. This arrangement not only facilitates the isolation of the tensile strands from the optical fibers inserted through the fanout tube (and prevents snagging), but because the confronting surface of the substrate can be configured with a smooth topology devoid of significant surface irregularities, the fanout tube can present a low-friction surface along which the optical fibers may slide during insertion of the optical fibers through the fanout tube. In view of the reconfiguration of the strength member of the fanout tubes, the high-cost furcation tubes associated with conventional fanout tubes (e.g., see FIG. 2) may be omitted from their construction. Accordingly, the costs associated with the fanout tubes, and furcated multi-fiber cable assemblies that use fanout tubes, may be significantly reduced. Given the high volume of fiber optic cables produced on a yearly basis, the improved fanout tubes of the present disclosure represent significant cost savings for cable manufacturers.

Figure 3:
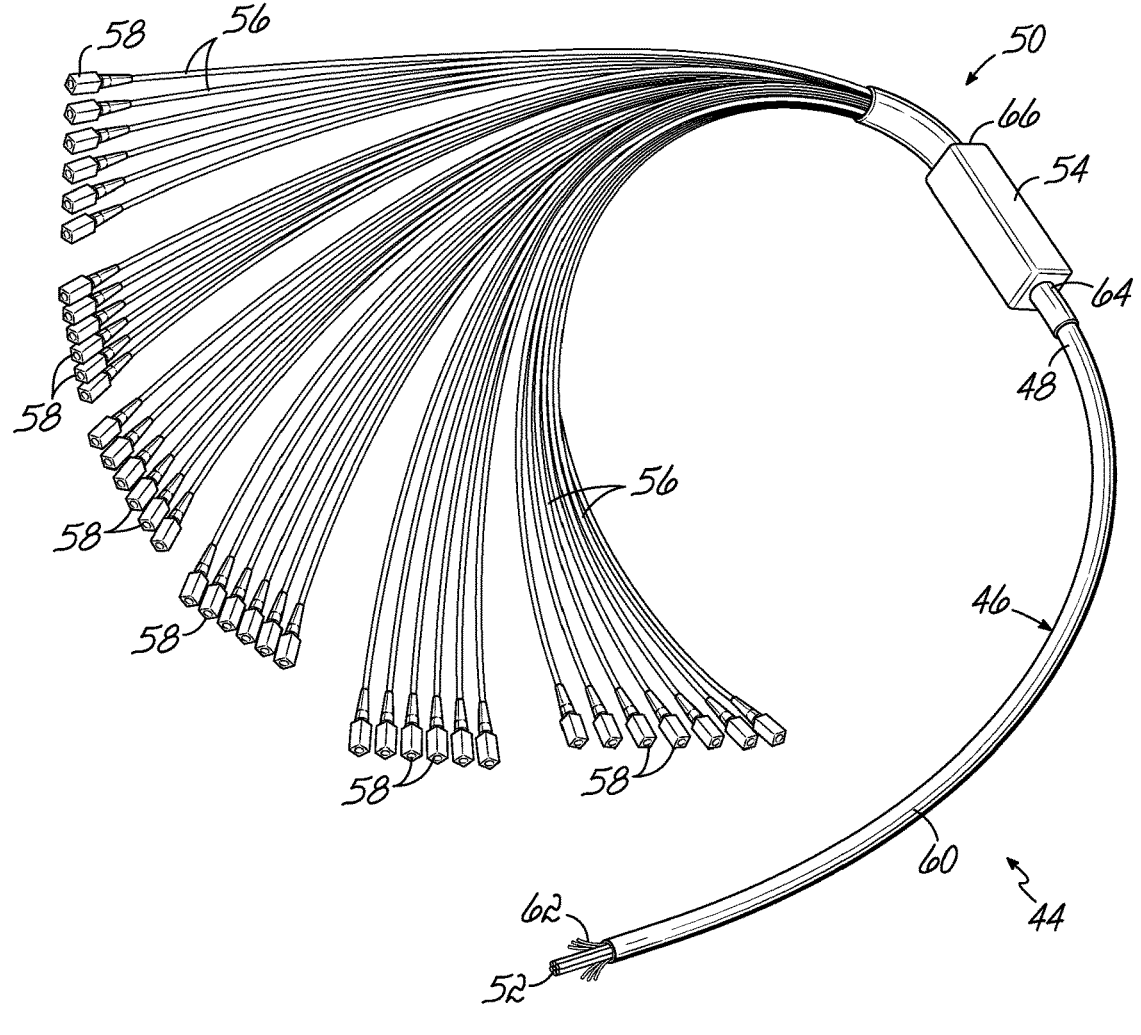
FIG. 3 is a perspective view of a cable assembly having fanout tubes in accordance with an embodiment of the disclosure.

Turning now to FIG. 3, a cable assembly 44 in accordance with aspects of the disclosure is illustrated. The cable assembly 44 includes a multi-fiber cable 46 having a first end 48 and a second end (not shown). The first end 48 includes a furcation 50 for dividing the optical fibers 52 carried by the fiber optic cable 46. The furcation 50 includes a furcation housing 54, a plurality of fanout tubes 56, and a plurality of fiber optic connectors 58 that terminate the optical fibers 52 being carried by the fiber optic cable 46. While the cable assembly 44 illustrated in FIG. 3 shows only the first end 48 including a furcation 50, it should be understood that in one embodiment, the second end of the cable assembly 44 may also include a furcation (not shown) similar to furcation 50 at the first end 48. Alternatively, however, the second end of the cable assembly 44 may have a different configuration.

The multi-fiber cable 46 is well known in the fiber optics industry and includes a plurality of optical fibers 52 surrounded by an outer protective sheath or jacket 60. The optical fibers 52 may be bare optical fibers or may be assemblies having an outer protective jacket. Additionally, the multi-fiber cable 46 or the individual optical fiber assembles may include strength members, such as a plurality of generally longitudinally extending aramid yarns 62, to support and protect the optical fibers 52 in the fiber optic cable 46. The fiber optic cable 46 of the cable assembly 44 may have a length up to several thousands of meters (m), and lengths up to 300 m are common. However, other lengths for fiber optic cable 46, such as between 0.5 m and about 50 m may also be possible. Shorter cable assemblies 44 may be described as "patchcords," which are often used for signal routing between receptacles in optical equipment separated by relative short distances (e.g., within a terminal or within a data center).

Figure 4:
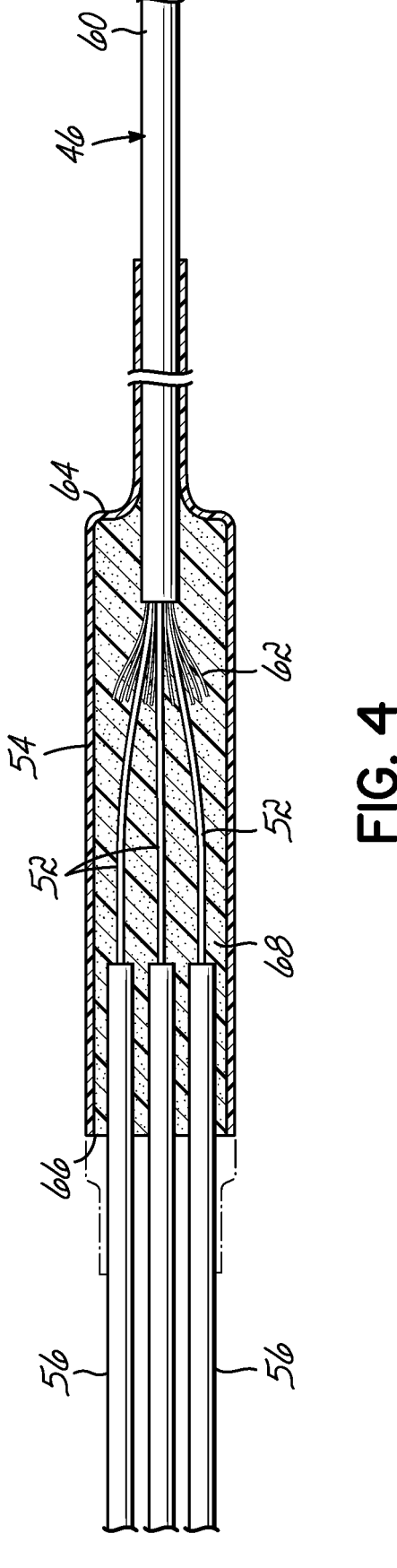
FIG. 4 is a cross sectional view of a furcation housing used in the furcation in the cable assembly shown in FIG. 3.

The furcation housing 54 operates as a demarcation for the furcation 50 and, as noted above, further operates to isolate the optical fibers 52 and connectors 58 extending from the housing 54 from various stresses on the fiber optic cable 46. The furcation housing 54 may take the form of a generally elongate rectangular or cylindrical housing/body (rectangular housing illustrated in FIG. 3) having a first end 64 configured to receive the fiber optic cable 46 and a second end 66 configured to receive the plurality of fanout tubes 56. As illustrated in FIG. 4, the optical fibers 52 carried by the fiber optic cable 46 pass from the cable 46, through the housing 54, and into the plurality of fanout tubes 56 extending from the second end 66 of the housing 54. The furcation housing 54 may be sized to accommodate the desired number of fanout tubes 56 extending from the housing 54. By way of example, the furcation housing 54 may be sized to accommodate as few as 2 fanout tubes 56 and as many as 72 or more fanout tubes 56. The furcation housing 54 is typically filled with a bonding agent 68 to securely fix the optical fibers 52 and yarns 62 from the fiber optic cable 46 and the plurality of fanout tubes 56 to the housing 54. The bonding agent 68 may include a wide range of adhesives, including epoxy resins, hot melt adhesives, polyurethanes, and other glues and agents.

Figure 1:
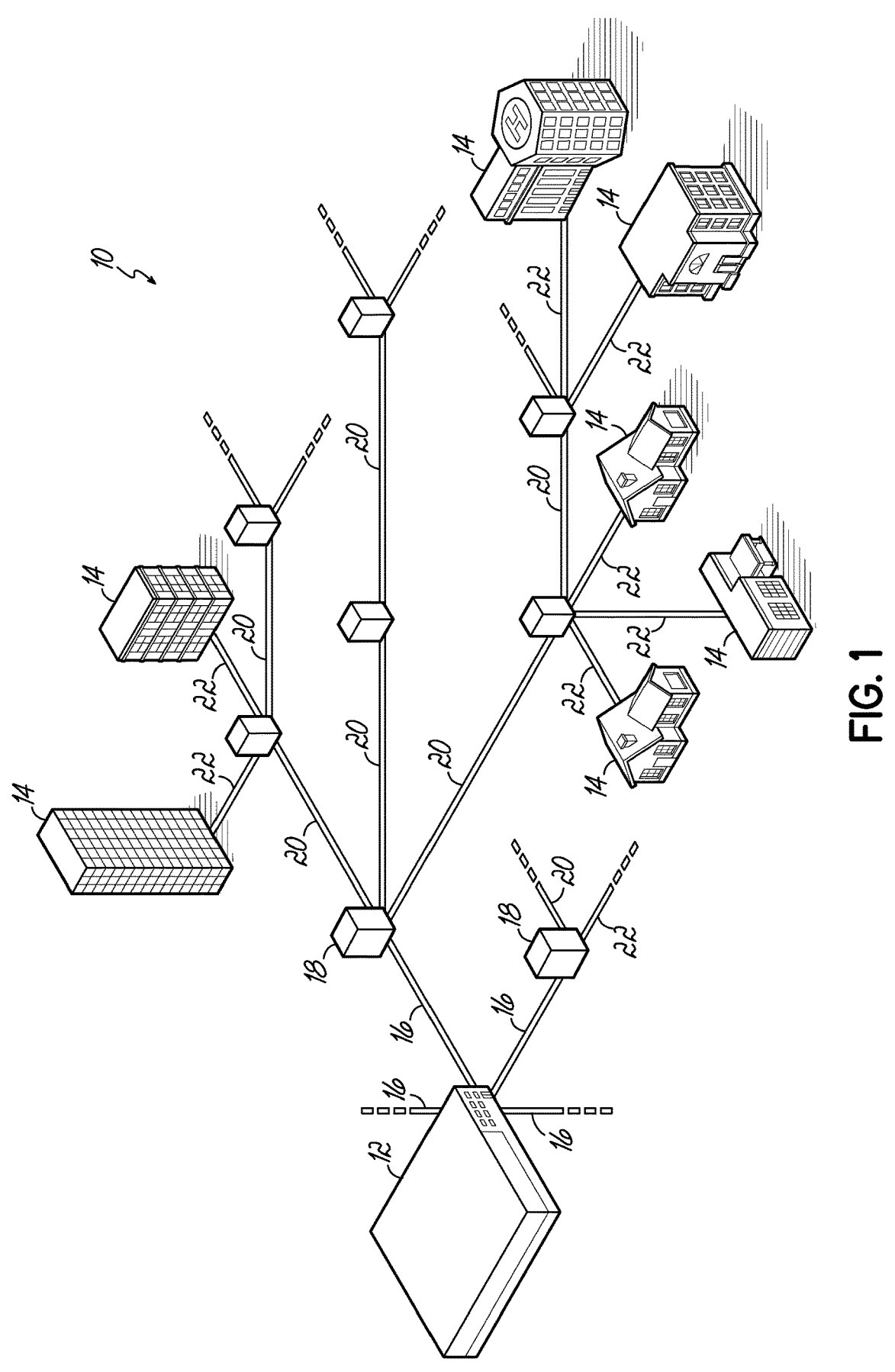
FIG. 1 is a schematic diagram of an exemplary FTTx network.
Figure 2:
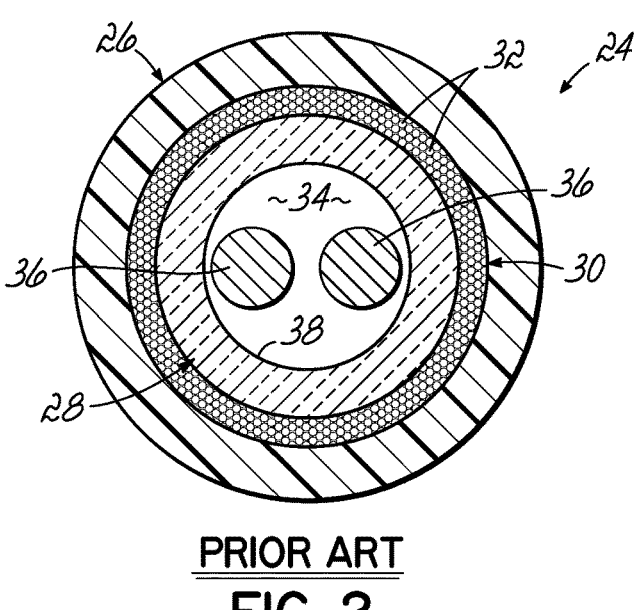
FIG. 2 is a cross-sectional view of a fanout tube in accordance with the prior art.

In accordance with an aspect of the disclosure, the fanout tubes 56 in the furcation 50 of the cable assembly 44 have a design that overcomes many of the drawbacks of current fanout tubes, such as fanout tubes 24 illustrated in FIG. 2, for example. More particularly, the fanout tubes 56 are configured to: i) provide sufficient strength for protecting the optical fibers 52 extending from the furcation housing 54 to the fiber optic connectors 58; ii) allow the optical fibers 52 to be pushed through the desired length of the fanout tubes 56 during construction of the furcation 50; and iii) achieve these features at a reduced cost compared to conventional fanout tubes. In embodiments of the present disclosure, this is achieved by reconfiguring the strength members associated with the fanout tubes 56. As will be discussed below, by reconfiguring the strength member, the high-cost furcation tubes 28 may be omitted from the construction of the fanout tubes 56 without loss of functionality. Thus, the cost of the fanout tubes 56 and the cable assembly 44 as a whole may be reduced.

FIGS. 5A-5E schematically and conceptually illustrate the reconfiguration of a strength member 72 away from a loose collection of yarns, as illustrated in FIG. 2, to something that is more organized and has more structure. From a broad perspective, the reconfigured strength member 72 includes at least one substrate 74 and at least one tensile strand 76 associated with (e.g., carried by, coupled to, etc.) the at least one substrate 74. As illustrated in these figures, the at least one substrate 74 at least partially covers the at least one tensile strand 76 and generally defines a confronting surface 78 that is isolated from the at least one tensile strand 76. As will be demonstrated below, the confronting surface 78 of the strength member 72, when the strength member 72 is incorporated into the fanout tube 56, generally faces the optical fibers 52 and may be contacted by the optical fibers 52 as they are being pushed through the fanout tube 56. Thus, the at least one substrate 74 associated with the strength member 72 is configured to minimize or prevent the at least one tensile strand 76 from being contacted by the optical fibers 52 inserted through the fanout tube 56. That is, the substrate 74 essentially operates as a buffer between the at least one tensile strand 76 of the strength member 72 and the one or more optical fibers 52 being inserted through the fanout tube 56. Thus, the possibility of the one or more optical fibers 52 becoming snagged or entangled with the at least one tensile strand 76 is avoided.

Furthermore, because the confronting surface 78 of the substrate 74 of the strength member 72 may be in contact with the optical fibers 52 during formation of the furcation 50 in cable assembly 44, the confronting surface 78 is preferably configured to have a relatively smooth topology devoid of any burrs or other significant surface irregularities that might significantly resist the movement of the optical fibers 52 through the fanout tube 56 should there be contact between the optical fibers 52 and the strength member 72. In this disclosure, the confronting surface 78 of the strength member 72 having a smooth topology means that the coefficient of friction is below 0.7, and preferably below 0.4. In an exemplary embodiment, the at least one substrate 74 may be formed from a suitable plastic material, similar to, for example, the material that typically forms the outer jacket 60 of the fiber optic cable 46 or that forms the outer jacket 26 of a conventional fanout tube 24. By way of example and without limitation, the substrate 74 of the strength member 72 may be formed from polyvinyl chloride (PVC), polyethylene (PE), or other suitable plastics. These materials are, for example, considerably less costly than the PTFE used to make the furcation tubes 28 of conventional fanout tubes 24. Moreover, these materials are capable of coefficient of friction values in the desired range during the manufacturing of the substrate 74. By way of example and without limitation, the substrate 74 may be formed through an extrusion process, and the extrusion die may be machined to provide a high-precision edge along the portion of the die outlet that forms the confronting surface 78 of the substrate 74. As a result, the confronting surface 78 of the substrate 74 will be smooth and include the desired coefficient of friction.

In order to maximize the size of the passageway of the fanout tube 56 that receives the one or more optical fibers 52 (referred to as the inner cavity below), which is advantageous for several reasons, it may be desirable to minimize the thickness of the substrate 74 (but maintain functionality of the strength member 72). By way of example and without limitation, the substrate 74 may have a thickness of between about 0.01 millimeter (mm) and about 0.25 mm. In various embodiments, the substrate 74 may be configured as a thin-film strip or web, a thin-film tape, a thin plate-like strip, an elongate solid or hollow tube, or other configurations suitable for use with the fanout tube 56. In any event, the notable features of the strength member 72, generally regardless of the particular configuration, include at least one substrate 74 associated with the at least one tensile strand 76, the substrate 74 defines a confronting surface 78 substantially isolated from the at least one tensile strand 76 that is configured to face and potentially contact the optical fibers 52 during insertion of the optical fibers 52 through the fanout tube 56, and the confronting surface 78 is configured to have a low coefficient of friction.

Turning to the tensile strands 76, in an exemplary embodiment, the at least one tensile strand 76 may include one or more elongate tensile elements. By way of example and without limitation, the one or more tensile elements may include one or more yarns, including aramid yarns, glass yarns, polyester yarns, or other similar material. In one embodiment, the at least one tensile strand 76 may include a plurality of yarns bundled, and optionally held (e.g., adhesives, threads, etc.), together to form the at least one tensile strand 76. In one embodiment, the strength member 72 may include but a single tensile strand 76. In an alternative embodiment, however, the strength member 72 may include a plurality of tensile strands 76. For example, the strength member 72 may include 3, 4, 8 or even more tensile strands 76. In an exemplary embodiment, the tensile strand(s) 76 may have a diameter between about 0.2 mm and about 0.55 mm. However, other diameter values may be possible. While the at least one tensile strand 76 is illustrated as having a circular cross-sectional profile, it should be appreciated that the at least one tensile strand 76 may have a host of other cross-sectional profiles, including oval, rectangular, triangular, or other polygonal configurations.

Figures 5A, 5B, 5C, 5D, 5E:
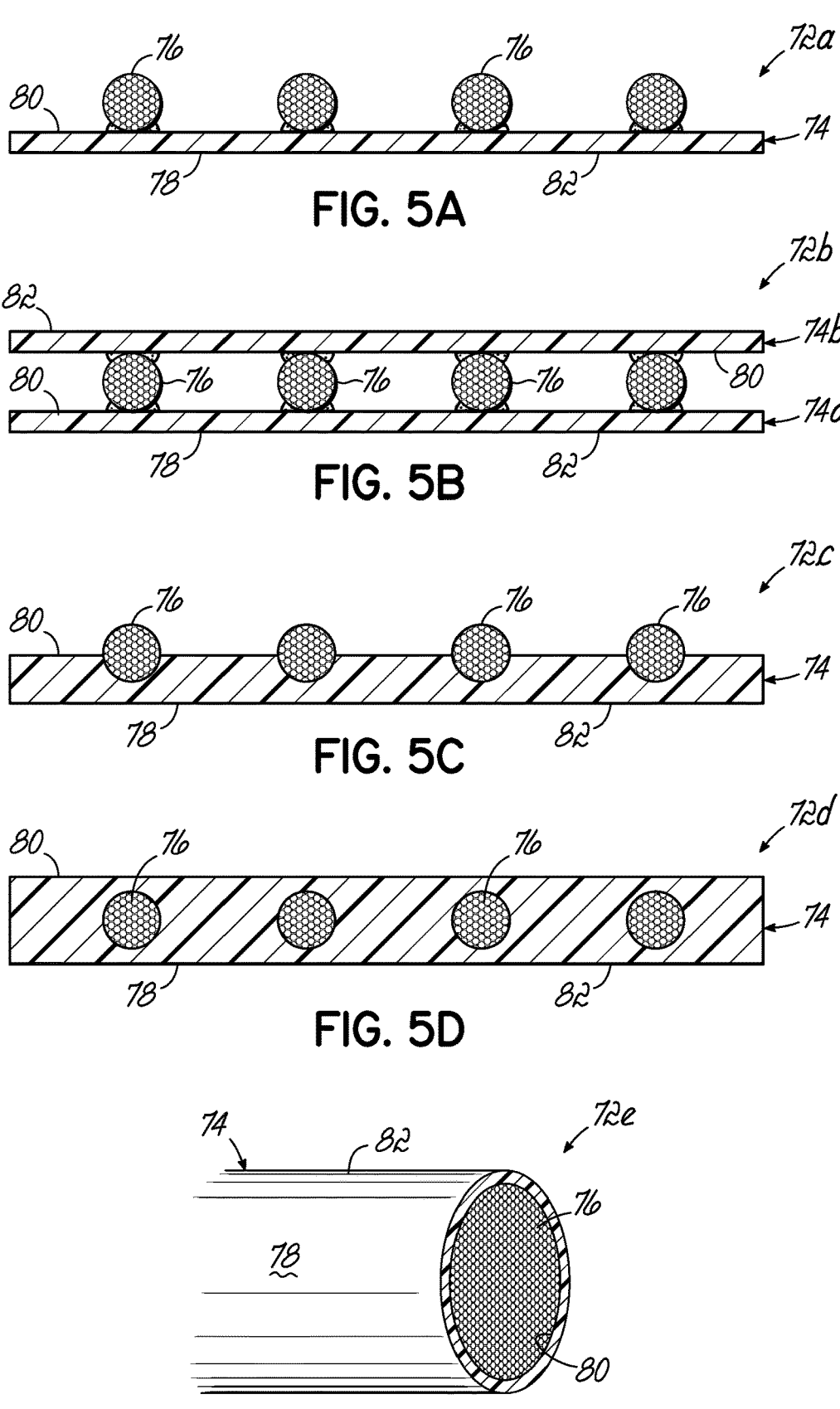
FIGS. 5A-5E illustrate various strength members in accordance with embodiments of the disclosure.

As noted above, FIGS. 5A-5E schematically illustrate various embodiments of strength members 72 in accordance with aspects of the disclosure. These figures are not meant to provide an exhaustive collection of potential configurations of the strength member 72 but are meant to demonstrate that the strength member 72 may take a variety of configurations and remain within the scope of the present disclosure. FIG. 5A schematically illustrates a strength member 72a according to one embodiment including a substrate 74 having a first surface 80 to which the tensile strands 76 are attached and a second surface 82, at least a portion of which is configured to operate as the confronting surface 78 of the strength member 72a that is isolated from the tensile strands 76. In this embodiment, the tensile strands 76 may be, for example, adhesively bonded to the first surface 80 of the substrate 74. FIG. 5B schematically illustrates a strength member 72b according to another embodiment having a pair of substrates 74a, 74b attached to opposed sides of the tensile strands 76, such as by a suitable adhesive. The second side 82 of one of the substrates, e.g., substrate 74a, may include at least a portion that is configured to operate as the confronting surface 78 of the strength member 72b that is isolated from the tensile strands 76.

FIG. 5C schematically illustrates a strength member 72c according to another embodiment having tensile strands 76 which are partially embedded in the first surface 80 of the substrate 74. The second surface 82 of the substrate 74 may include at least a portion that is configured to operate as the confronting surface 78 of the strength member 72c that is isolated from the tensile strands 76. FIG. 5D schematically illustrates a strength member 72d according to another embodiment having tensile strands 76 that are completely embedded in the substrate 74 between the first and second surfaces 80, 82. The second surface 82 of the substrate 74 may include at least a portion that is configured to operate as the confronting surface 78 of the strength member 72d that is isolated from the tensile strands 76.

In yet another embodiment, FIG. 5E schematically illustrates a strength member 72e having a tubular configuration with a solid cylindrical configuration and where the substrate 74 is provided as an outer coating or cover disposed around the outside of the tensile strand 76, thereby encapsulating the tensile strand 76. In this configuration, the first surface 80 of the substrate 74 operates an inner surface that faces the tensile strand 76 and the second surface 82 of the substrate 74 operates as an outer surface that faces away from the tensile strand 76. At least a portion of the second surface 82 is configured to operate as the confronting surface 78 of the strength member 72e that is isolated from the tensile strands 76.

FIGS. 6A-6E illustrate fanout tubes 56 in accordance with embodiments of the disclosure. The fanout tube 56 includes an outer casing 86 that defines an outer surface 88 and an inner open cavity 90 of the fanout tube 56. The inner open cavity 90 of the fanout tube 56 is defined by one or more walls 92 and is configured to receive one or more optical fibers 52 therein when used to form the furcation 50 in cable assembly 44. In these embodiments, the outer casing 86 includes an outer jacket 94 and one or more strength members 96. The outer jacket 94 includes an outer surface 98 and an inner surface 100 and, as described above, the strength member 96 includes a substrate 74 associated with at least one tensile strand 76 and defines a smooth confronting surface 78 that is isolated from the at least one tensile strand 76. The outer jacket 94 and the one or more strength members 96 are arranged relative to each other to form the fanout tube 56 such that the one or more walls 92 of the inner open cavity 90 of the outer casing 86 are substantially formed by at least one of the confronting surface 78 of the one or more strength member 96 and the inner surface 100 of the outer jacket 94.

In this way, for example, substantially no portion of the at least one tensile strand 76 is open to or in communication with the inner open cavity 90 of the outer casing 86. Accordingly, the at least one tensile strand 76 is isolated from and inaccessible to the one or more optical fibers 52 being inserted through the inner open cavity 90 of the fanout tube 56 during formation of the furcation 50. Therefore, snagging or entangling the one or more optical fibers 52 with the at least one tensile strand 76 is avoided as the optical fibers 52 are pushed through the fanout tubes 56. Instead of the at least one tensile strand 76 being accessible to the one or more optical fibers 52, it is the substrate 74, and more particularly, the confronting surface 78 of the substrate 74, that is configured to face and potentially contact the one or more optical fibers 52 as they are being pushed through the fanout tube 56. As noted above, the confronting surface 78 is configured to have a smooth topology so as to provide a relatively low coefficient of friction. Moreover, in embodiments where the inner surface 100 of the outer jacket 94 forms a portion of the walls 92 that define the inner open cavity 90, that surface can also be made smooth and devoid of significant surface irregularities to also provide a relatively low coefficient of friction. Accordingly, substantially the entire surface that forms the inner open cavity 90 may have a smooth topology, and thus a relatively low coefficient of friction.

Furthermore, due to the configuration of the strength member 96 and its arrangement relative to the outer jacket 94, the size of the open cavity 90 of the outer casing 86 (i.e., the space that slidingly receives the optical fibers 52) is significantly larger than the passageway defined by the furcation tube 28 in conventional fanout tubes 24 (see FIG. 2). By way of example and without limitation, the furcation tubes 28 in conventional fanout tubes 24 (e.g., for FTTx and data center networks) have an inner cross-sectional area between about $0.1 \text{ mm}^2$ and about $0.3 \text{ mm}^2$ depending on the application. In contrast, the open cavity 90 of the outer casing 86 of fanout tube 56 is configured to have a cross-sectional area at least two times, preferably greater than four times, and even more preferably greater than about 10 times these values (and for similar applications). And this increase in cross-sectional area of the inner cavity 90 may be provided without a significant increase, if any, in the outer cross dimension of the outer casing 86. For example, this increase in cross-sectional area may be achieved while maintaining the outer diameter of the outer casing 86 to those of current fanout tubes, e.g., between about 2 mm (most common) and about 3.6 mm. Moreover, it is believed that this increase in cross-sectional area may be achievable with outer diameters of the outer casing being as low as 1.6 mm, and even 1.25 mm. In combination with the above, this additional space in the inner cavity 90 makes pushing the optical fibers 52 through the fanout tube 56 easier.

Figure 6A:
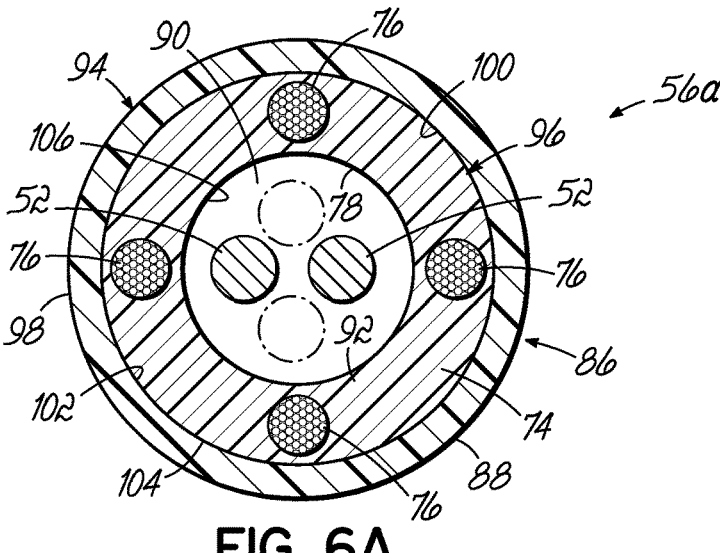
FIGS. 6A-6E illustrate various fanout tubes in accordance with embodiments of the disclosure.

FIG. 6A is a cross-sectional view of fanout tube 56a in accordance with one embodiment of the disclosure. As illustrated, the outer casing 86 includes an outer jacket 94 where the outer surface 98 of the outer jacket 94 defines the outer surface 88 of the outer casing 86 and the inner surface 100 of the outer jacket 94 defines a passageway 102. In this embodiment, the strength member 96 takes the form of that shown in FIG. 5D but in a tubular configuration. The strength member 96 is coaxially disposed in the passageway 102 of the outer jacket 94 such that the outer surface 104 of the strength member 96 is in abutting contact with the inner surface 100 of the outer jacket 94. The inner surface 106 of the strength member 96 defines substantially the entirety of the walls 92 of the inner open cavity 90 of the outer casing 86 and operates as the confronting surface 78 of the strength member 96. As illustrated, one or more optical fibers 52 (two shown) may be positioned in the inner open cavity 90. Notably, the tensile strands 76 of the strength member 96 are substantially completely isolated from the inner cavity 90 so as to be inaccessible to the optical fibers 52. Moreover, as the walls 92 of the cavity 90 are formed substantially entirely by the confronting surface 78 of the strength member 96, the walls 92 have a relatively low coefficient of friction that allows the optical fibers 52 to more easily slide within the fanout tube 56*a*.

Figure 6B:
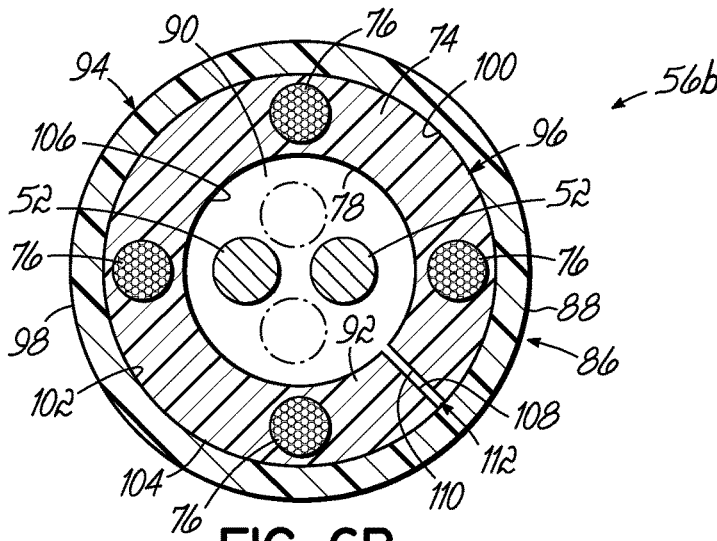

FIG. 6B is a cross-sectional view of fanout tube 56*b* in accordance with another embodiment of the disclosure. This embodiment is similar to that shown in FIG. 6A and thus only the differences will be highlighted in the following discussion. The primary difference is in the configuration of the strength member 96. More particularly, whereas the strength member 96 in FIG. 6A was tubular, the strength member 96 in FIG. 6B is C-shaped and having confronting, and preferably abutting or nearly abutting, longitudinal ends 108, 110. The strength member 96 may be configured relative to the outer jacket 94 such that any gap 112 between the two ends 108, 110 is smaller, and preferably significantly smaller (e.g., 50% or more), than the cross-dimension of the optical fibers 52 extending through the fanout tube 56*b*. In this way, for example, the one or more optical fibers 52 will be unable to enter the gap 112 or otherwise become impinged in the gap 112 during their insertion through the fanout tube 56*b*.

The C-shaped strength member 96 may be preferred for manufacturing purposes or other purposes. For example, the strength member 96 is separate from the outer jacket 94 and may be made in a separate process from the outer jacket 94. Furthermore, the strength member 96 may be made as a slab or generally rectangular plate-like member instead of a tubular member (as in FIG. 6A), which may simplify the manufacturing process for the strength member 96. By way of example, the slab-shaped strength member 96 may be formed through an extrusion process, for example. When it comes time to incorporate the strength member 96 with the outer jacket 94 to form the outer casing 86 of the fanout tube 56*b*, the strength member 96 may be rolled (e.g., longitudinally) so as to bring the side edges 108, 110 of the slab into confronting relationship with each other. Alternatively, the ends 108, 110 of the strength member 96 may slightly overlap each other in the rolled configuration (not shown). In this embodiment, for example, the ends 108, 110 may be slightly tapered to reduce the thickness of the strength member 96 in the overlap region.

In addition to improved manufacturing, the C-shaped strength member 96 may provide other benefits. For example, the strength member 96 may be configured such that the substrate 74 of the strength member 96 has a certain amount of stiffness associated with it. In this way, when then strength member 96 is rolled, there is an induced stress in the substrate 74 that urges the strength member 96 back toward the unrolled configuration. The induced stress operates much like a spring force. Accordingly, in the configuration of the strength member 96 as illustrated in FIG. 6B, this induced stress presses the strength member 96 up against the inner surface 100 of the outer jacket 94 and tightly secures the strength member 96 to the outer jacket 94.

Figure 6C:
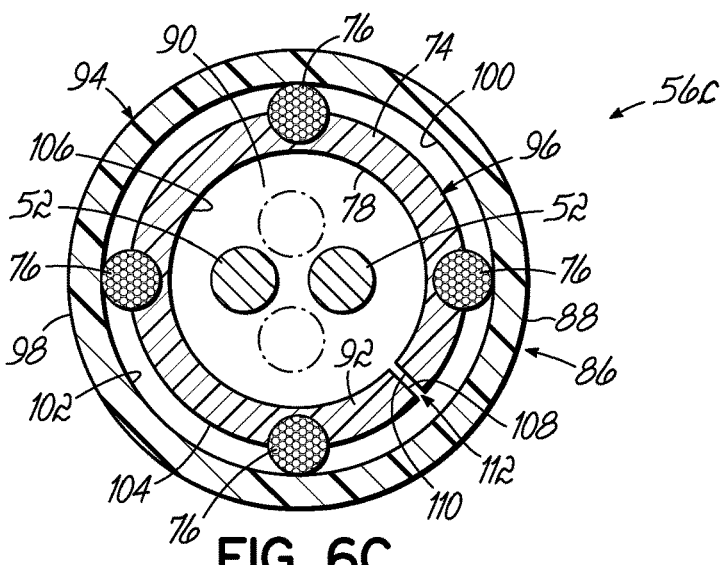

While FIGS. 6A and 6B illustrate a fanout tube 56 having a strength member 96 with a tubular and C-shaped configuration of the strength member 96, respectively, as illustrated in FIG. 5D, it should be appreciated that in alternative embodiments of the fanout tube 56, the strength member 96 may be configured similar to that illustrated in FIGS. 5A-5C in either the tubular configuration (similar to FIG. 6A) or a C-shaped configuration (similar to FIG. 6B). By way of example, FIG. 6C illustrates a fanout tube 56*c* where the strength member 96 is configured similar to that shown in FIG. 5C and in a C-shaped configuration. In these alternative embodiments, it should be appreciated that, similar to the above, the inner surface 106 of the strength member 96 defines substantially the entirety of the walls 92 of the inner open cavity 90 of the outer casing 86 and operates as the confronting surface 78 of the strength member 96. Thus, the tensile strands 76 of the strength member 96 are substantially completely isolated from the inner cavity 90 so as to be inaccessible to the optical fibers 52. Moreover, as the walls 92 of the cavity 90 are formed substantially entirely by the confronting surface 78 of the strength member 96, the walls 92 may have a relatively low coefficient of friction that allows the optical fibers 52 to more easily slide within the fanout tube 56*c* during, for example, the formation of the furcation 50 in the cable assembly 44.

Figures 6D, 6E:
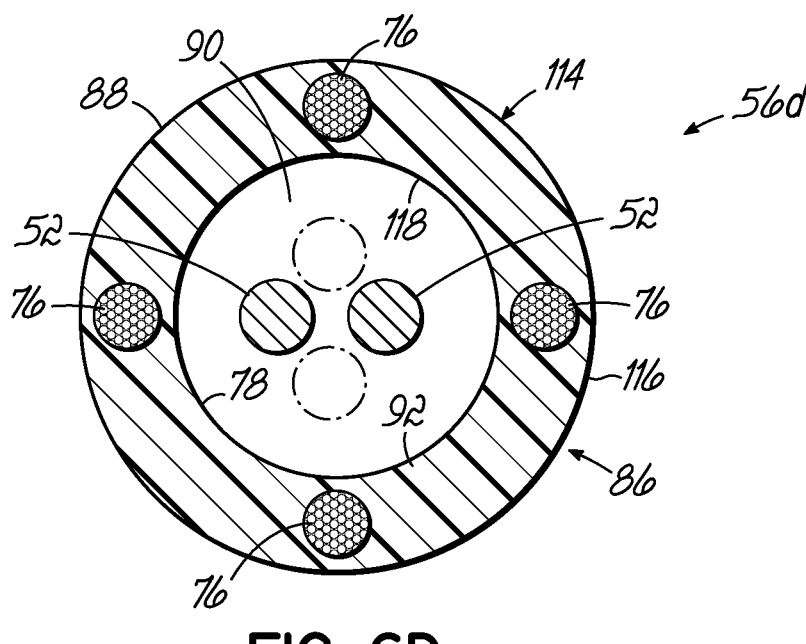

FIG. 6D is a cross-sectional view of a fanout tube 56*d* in accordance with another embodiment of the disclosure. This embodiment is similar to that shown in FIG. 6A and thus only the differences will be highlighted in the following discussion. The primary difference is in the configuration of the outer casing 86 formed by the outer jacket 94 and the strength member 96. More particularly, whereas the outer casing 86 in FIG. 6A included the outer jacket 94 and the strength member 96 as separate elements, in this embodiment, the outer jacket 94 and strength member 96 are integrated together as a monolithic element, referred to herein as an integrated jacket 114, where there is no discernible demarcation between the outer jacket 94 and the strength member 96. The integrated jacket 112 includes an outer surface 116 that operates as the outer surface 88 of the outer casing 86 and an inner surface 118 that defines the one or more walls 92 of the inner cavity 90 of the outer casing 86. The tensile strands 76 are substantially completely embedded in the material of the integrated jacket 114 between the inner surface 118 and the outer surface 116. The inner surface 118 of the integrated jacket 112 defines the confronting surface 78 such that the walls 92 of the inner cavity 90 are substantially entirely formed from the confronting surface 78 of the integrated jacket 112. Similar to the above, the tensile strands 76 of the integrated jacket 112 are substantially completely isolated from the inner cavity 90 so as to be inaccessible to the optical fibers 52 that extend through the fanout tube 56*d*. Moreover, as the walls 92 of the cavity 90 are formed substantially entirely by the confronting surface 78 of the integrated jacket 112, the walls 92 have a relatively low coefficient of friction that allows the optical fibers 52 to more easily slide within the fanout tube 56*d* during, for example, the formation of the furcation 50 in the cable assembly 44.

FIG. 6E is a cross-sectional view of a fanout tube 56*e* in accordance with another embodiment of the disclosure. This embodiment is somewhat of a departure from the previous embodiment and thus will be described in more detail. Like the above embodiment, the outer casing 86 is formed by an outer jacket 94 and a strength member 96, where the outer jacket 94 includes an outer surface 98 and an inner surface 100. The outer surface 98 of the outer jacket 94 defines the outer surface 88 of the outer casing 86. In this embodiment, the strength member 96 is configured similar to the strength member 72*e* illustrated in FIG. 5e. More particularly, the strength member 96 is not coaxially disposed in the passageway 102 so as to extend along the inner circumference of the outer jacket 94. Instead, the strength member 96 extends in the passageway 102 along the length of the outer jacket 94, much like the optical fibers 52. This configuration of the strength member 96 changes how the inner open cavity 90 is defined. More particularly, in this embodiment, the walls 92 of the inner cavity 90 are defined by the inner surface 100 of the outer jacket 94 and the outer surface 120 of the substrate 74 that encapsulates tensile strand 76 of the strength member 96. Recall that the outer surface 120 of the encapsulating substrate 74 forms the confronting surface 78 of the strength member 96 and thus includes a smooth topology (see FIG. 5E). Moreover, since the inner surface 100 of the outer jacket 94 also forms part of the walls 92 of the inner cavity 90, the inner surface 100 may also be configured to have a smooth topology thereby providing a low coefficient of friction. Although FIG. 6E shows only one strength member 96 associated with the fanout tube 56e, it should be appreciated that more than one strength member 96 may be provided in the passageway 102 of the outer jacket 94 of the fanout tube 56e.

Although multiple elements collectively define the walls 92 of the inner cavity 90, it should be appreciated that even in this embodiment, the tensile strands 76 of the strength member 96 are substantially completely isolated from the inner cavity 90 so as to be inaccessible to the optical fibers 52 as they are inserted through the fanout tube 56e. Additionally, as the walls 92 of the cavity 90 are formed substantially entirely by the confronting surface 78 of the strength member 96 and a smooth inner surface 100 of the outer jacket 94, the walls 92 have a relatively low coefficient of friction that allows the optical fibers 52 to more easily slide within the fanout tube 56e during, for example, the formation of the furcation 50 in the cable assembly 44.

Figure 7:
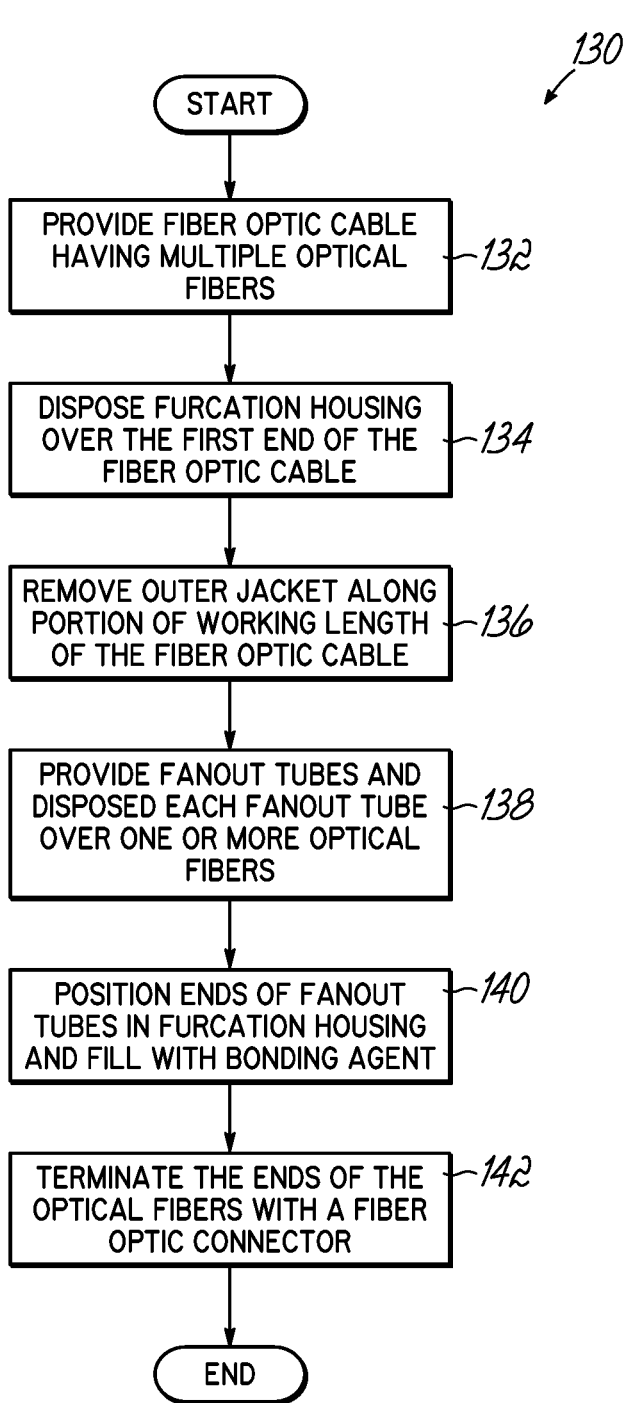
FIG. 7 is a flowchart illustrating a method for making a cable assembly using fanout tubes in accordance with embodiments of the disclosure.

FIG. 7 illustrates an exemplary method 130 for making a cable assembly, such as cable assembly 44 illustrated in FIG. 3, in accordance with an embodiment of the disclosure. In a first step 132, a multi-fiber fiber optic cable 46 having a first end 48 may be provided. The fiber optic cable 46 is configured to carry a plurality of optical fibers 52 within an outer jacket 60 of the cable 46. In a next step 134, a furcation housing 54 (with the first end 64 first) may be disposed over the first end 48 of the fiber optic cable 46 such that a working length of the fiber optic cable 46 extends beyond the second end 66 of the furcation housing 54. In a next step 136, at least a portion of the working length of the fiber optic cable 46 extending beyond the second end 66 of the furcation housing 54 may have its outer jacket 60 removed to expose the optical fibers 52 and the aramid yarns 62. If the optical fibers 52 are themselves jacketed, those jackets may similarly be removed to expose bare optical fibers 52 and aramid yarns 62 beyond the end of the outer jacket 60 of the fiber optic cable 46. Those of ordinary skill in the art will understand how to strip the outer jacket 60 from the fiber optic cable 46 to expose the optical fibers 52 and a further detailed explanation of that process will not be provided herein.

In a next step 138, a plurality of fanout tubes 56 may be provided and each fanout tube 56 may be disposed over one or more optical fibers 52 in the group of optical fibers 52 being carried by the fiber optic cable 46. The number of optical fibers 52 that are disposed in each of the fanout tubes 56 may be determined by the type of connector 58 that will terminate the optical fibers 52. By way of example, for a single fiber connector, each fanout tube 56 may include only a single optical fiber 52. However, if a duplex connector or multi-fiber connector terminates the optical fibers 52, then more than one optical fiber 52 will be carried in each of the fanout tubes 56 (e.g., corresponding to the number of fibers the connector is designed for). For example, for a duplex connector, each fanout tube 56 may carry two optical fibers 52. For a multi-fiber connector (e.g., MPO connector), each fanout tube 56 may carry even more optical fibers 52, such as eight, twelve, or twenty-four optical fibers 52. The fanout tubes 56 used in this method 130 are those in accordance with the present disclosure and described above. Thus, the fanout tubes 56 lack the high-cost furcation tubes of conventional fanout tubes. Moreover, the fanout tubes 56 define an inner cavity 90 for receiving the one or more optical fibers 52 that is generally larger than the passageway provided by the furcation tubes in conventional fanout tubes. Furthermore, the tensile strands 76 of the fanout tubes 56 are substantially isolated from the inner cavity 90 such that they are generally inaccessible by the one or more optical fibers 52.

In this process, the ends of the one or more optical fibers 52 are inserted into the inner cavity 90 at a first end of the fanout tube 56 and pushed through the length of the fanout tube 56. The smooth topology of the one or more walls 92 that form the inner cavity 90 facilitates the movement of the one or more optical fibers 52 through the fanout tube 56. Due to the increased cross-sectional area of the inner cavity 90 and the low coefficient of friction of its walls 92, the length of the fanout tubes 56 may be increased. Whereas conventional fanout tubes are limited to a length less than about 3 m, it is believed that fanout tubes 56 according to the present disclosure may have a length up to about 10 m and still allow the optical fibers 52 to be pushed through the fanout tube 56. In any event, the one or more optical fibers 52 are configured to extend beyond a second end of the fanout tube 56.

In a next step 140, the first ends of the fanout tubes 56 may be disposed in the furcation housing 54 and the furcation housing 54 filled with a bonding agent 68 (e.g., see FIG. 4). This secures the fiber optic cable 46 and the fanout tubes 56 to the furcation housing 54. With this arrangement, stresses applied to the fiber optic cable 46 are not transmitted to the optical fibers 52 extending through the fanout tubes 56 on the other side of the furcation housing 54. In another step 142, the ends of the optical fibers 52 extending beyond the second end of the fanout tubes 56 may be terminated by a suitable fiber optic connector 58. Such connectors 58 may include single and/or multi-fiber connectors. By way of example and without limitation, connectors 58 may include LC, SC, ST, MU, MDC, MPO, CS, and/or SN type connectors. Other types of connectors may also be possible, including lensed connectors. Those of ordinary skill in the art understand how to terminate an optical fiber with a suitable fiber optic connection and a more detailed explanation will not be provided herein. In the exemplary method described above, the resulting cable assembly 44 includes a furcation 50 at a first end 48 of the fiber optic cable 46. In another embodiment, the method described above may be repeated to form a furcation 50 at a second end of the fiber optic cable 46 such that the cable assembly 44 includes a furcation 50 at both ends of the fiber optic cable 46.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The disclosure in its broader aspects is therefore not limited to the specific details, representative apparatus and methods and illustrative examples shown and described. Accordingly, departures may be made from such details without departing from the scope of the disclosure.

What is claimed is:

1. A fanout tube for a furcation of a fiber optic cable assembly carrying a plurality of optical fibers, comprising:

an outer casing defining an outer surface and an inner cavity, the inner cavity configured to receive one or more of the plurality of optical fibers therethrough, the outer casing comprising:

an outer jacket defining a jacket outer surface and a jacket inner surface that defines a passageway; and at least one strength member disposed in the passageway of the outer jacket, wherein the at least one strength member includes at least one tensile strand and a substrate associated with and at least partially covering the at least one tensile strand, and wherein the at least one tensile strand is adhesively bonded to the substrate;

wherein at least a portion of the substrate defines a confronting surface configured to form at least a portion of the inner cavity of the outer casing and be isolated from the at least one tensile strand such that the at least one tensile strand is inaccessible to optical fibers being inserted through the inner cavity of the fanout tube.

2. The fanout tube of claim 1, wherein the at least one tensile strand is at least partially embedded in the substrate.

3. The fanout tube of claim 2, wherein the at least one tensile strand is substantially completely embedded in the substrate.

4. The fanout tube of claim 1, wherein the strength member is tubular or C-shaped having opposed ends that confront or overlap each other.

5. The fanout tube of claim 1, wherein the substrate of the strength member is configured as a thin-film web or a tape.

6. The fanout tube of claim 1, wherein one or more walls define the inner cavity of the outer casing, and wherein the confronting surface of the strength member forms substantially an entirety of the one or more walls that define the inner cavity.

7. The fanout tube of claim 1, wherein the outer jacket and the at least one strength member are integrated together to form a monolithic integrated jacket.

8. The fanout tube of claim 1, wherein the outer jacket and the at least one strength member are separate elements of the outer casing.

9. The fanout tube of claim 8, wherein the substrate forms an outer coating that encapsulates the at least one tensile strand.

10. The fanout tube of claim 8, wherein the inner wall of the outer jacket forms at least a portion of the inner cavity.

11. The fanout tube of claim 1, wherein the at least one tensile strand includes a plurality of elongate yarns.

12. The fanout tube of claim 1, wherein the at least one strength member includes a plurality of tensile strands.

13. The fanout tube of claim 1, wherein the confronting surface of the substrate has a smooth topology with a coefficient of friction less than about 0.7, and preferably less than about 0.4.

14. The fanout tube of claim 1, wherein the outer casing includes a plurality of strength members.

15. A cable assembly, comprising:

a fiber optic cable having a first end and carrying a plurality of optical fibers; and a furcation formed at the first end of the fiber optic cable, the furcation comprising:

a plurality of fanout tubes each according to claim 1, wherein each fanout tube includes one or more optical fibers of the plurality of optical fibers extending therethrough; and a plurality of fiber optic connectors, each connector terminating the one or more optical fibers extending through a respective one of the plurality of fanout tubes.

16. The cable assembly of claim 15, wherein the fiber optic cable includes a second end, and wherein the cable assembly further comprises a furcation formed at the second end of the fiber optic cable.

* * * * *